C. D. LUDWIG.
INSTRUMENTS FOR FILLING TEETH.

No. 174,267. Patented Feb. 29, 1876.

UNITED STATES PATENT OFFICE.

CARL D. LUDWIG, OF HOUSTON, TEXAS.

IMPROVEMENT IN INSTRUMENTS FOR FILLING TEETH.

Specification forming part of Letters Patent No. 174,267, dated February 29, 1876; application filed January 15, 1876.

*To all whom it may concern:*

Figure 1:
Figure 2:
Figure 3:
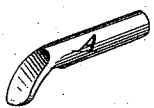
Figure 4:

Be it known that I, CARL D. LUDWIG, of Houston, Harris county, Texas, have invented a new and useful Improvement in Filling Teeth, of which the following is a specification:

Figure 1 represents a tooth filled by my improved process, and Figs. 2, 3, and 4 represent three forms of instruments used in filling the teeth.

Similar letters of reference indicate corresponding parts.

The object of this invention is to furnish an improved mode of filling teeth, by the use of which the filling may be built up, hardened, and polished at once, so that the filling will be as hard as marble when the patient leaves the operator's chair, and so that they can be immediately used for masticating.

The invention consists in the mode of harding and polishing filling for the teeth by the use of instruments made of talc, and whether heated or not, as hereinafter fully described.

In carrying my improvement into practical effect, I use any of the ossioplastic or non-metallic fillings, such, for instance, as oxychloride of zinc, Guillois cement, or artificial cement Blomb, &c. The tooth to be filled is protected against saliva by the aid of rubber dams. The filling is then mixed to the required consistency and the tooth is filled. In the case of large cavities or contour fillings, the filling is built up by degrees. In the case of small cavities, the filling is done at once. The filling is then hardened with instruments A, of talc, three of which are shown in Figs. 2, 3, and 4, and which may be made of any desired or required form. The talc instruments are heated over an alcohol flame, and are applied to the filling as soon as it is set. This process is repeated and the filling is rubbed gently until it shows a dull polish on the surface, which polish is brightened by using a polisher of agate or polished steel. The agate or steel polishing instruments or burnishers are of the usual patterns used by dentists. The same result may be obtained by using the talc instruments without heating them by waiting until the filling hardens, but I prefer to use them heated, as it prevents all shrinkage, and the filling is complete and as hard as marble when the patient leaves the operator. When the old instruments are used, several days have to intervene between the filling and the final polishing, or, rather, the polishing has to be repeated after several days.

I am aware that Arkansas stone has been long used as a material for dentists' tools, but it crumbles when exposed to a flame or high heat, and has not the property of imparting a polish to the filling. When heated, talc enamels or polishes the composition by filling the pores.

What I claim is—

A dental instrument, for hardening and polishing tooth-fillings, made of talc, as and for the purpose specified.

CARL D. LUDWIG.

Witnesses:
E. F. SCHMIDT,
F. MOHL.